United States Patent [19]

Zemp

[11] 4,393,145

[45] Jul. 12, 1983

[54] ANIONIC ION EXCHANGE RESINS WITH CHOLESTEROL-DECREASING PROPERTIES

[75] Inventor: Hans N. Zemp, Lugano, Switzerland

[73] Assignee: Etablissement Texcontor, Vaduz, Liechtenstein

[21] Appl. No.: 294,146

[22] Filed: Aug. 19, 1981

Related U.S. Application Data

[63] Continuation of Ser. No. 35,091, May 1, 1979, abandoned.

[51] Int. Cl.³ ............................................. B01J 41/12
[52] U.S. Cl. ....................................... 521/38; 521/33; 521/34
[58] Field of Search ............................. 521/38, 33, 34

[56] References Cited

U.S. PATENT DOCUMENTS

| | | | |
|---|---|---|---|
| 3,551,357 | 12/1970 | Corte et al. | 521/31 |
| 3,627,708 | 12/1971 | Morse et al. | 521/38 |
| 3,846,541 | 11/1974 | Howard | 521/33 |
| 4,198,395 | 4/1980 | Simone | 521/32 |
| 4,340,585 | 7/1982 | Borzatto et al. | 521/32 |

Primary Examiner—Joseph L. Schofer
Assistant Examiner—Peter F. Kulkosky
Attorney, Agent, or Firm—Morgan, Finnegan, Pine, Foley & Lee

[57] ABSTRACT

These resins are in particular non toxic styrene, acrylic or epoxy resins, with strong cholesterol-decreasing properties, which have an apparent density in water of 0.18 to 0.20 g of dry material/ml and a water absorption capacity of 69 to 73% by weight of the polymer weight.

The process for producing anionic ion exchange resins with strong cholesterol-decreasing properties in which a mixture of monomers containing a critical percentage of cross-linking monomer, consists of polymerizing at a low rate so as to give the polymer a critically predetermined and uniformly distributed degree of cross-linkage, corresponding to an apparent density in water of 0.18 to 0.20 of dry material/ml with a water absorption capacity of 69 to 73% by weight of the polymer weight, wherein the polymerization catalyst used in an organic peroxide in a concentration of 0.2 to 3%, and the cross-linking agent used is a divinyl compound in a percentage of 1.5 to 12%, at a polymerization temperature of 50° to 80° C.

14 Claims, No Drawings

ANIONIC ION EXCHANGE RESINS WITH CHOLESTEROL-DECREASING PROPERTIES

This is a continuation, of application Ser. No. 035,091 filed May 1, 1979, now abandon.

This invention relates to anionic ion exchange resins for use in human therapy as cholesterol-decreasing agents. Ion exchange resins have notably found use in the treatment of various pathological states such as hyperacidity, prevention of $Na^+$ depletion in the gastroenteric tract, induction of $K^+$ depletion, treatment of nephrotic, pancreatic and cardiac edema, treatment of ulcer, neutralisation of gastric acidity etc.

Obviously each particular pathological state requires a resin of special chemical characteristics, chosen from the group consisting of weakly acid resins, strongly acid resins, weakly basic resins, and strongly basic resins, provided that these resins are free from toxicity towards the human organism.

The use of ion exchange resins has notably been extended in recent years to the treatment of hyperlipemias. It is in fact known that at too high levels of lipids, which are essentially cholesterol and triglicerides, early arteriosclerosis can develop in the organism, with consequences such as cardiac infarct and cerebral thrombosis.

Hyperlipemia is therefore a vast problem for which the resolutive drug has as yet not been found.

To reduce cholesterol to normal levels, it is necessary to both exclude all those foodstuffs which are rich in them or in saturated fats, and to increase its elimination.

It has been found that ion exchange resins of basic character act in this second manner by fixing the bile acids at the intestinal level, thus interrupting the enterohepatic recycle, with consequent loss of cholesterol.

In order to carry out this cholesterol-decreasing method on a practical scale, certain basic anionic exchange resins have been produced up to the present time containing amino and/or ammonium groups able to chemically fix the bile acids.

The resins prepared and used up to the present time are essentially Cholestyramine and Cholestypol. The first of these resins is essentially a styrene resin containing quaternary ammonium groups cross-linked by divinylbenzene, whereas the second is a polymer of N-(2-amino ethyl)-1, 2-ethanediamine with chloromethyl oxiran. Although from a theoretical aspect the chemical operation of these resins seems clear and therefore clearly determinable from a quantitative point of view, in practice the results attained with them have been much worse than forecast, and could be improved.

In particular, often in contrast with the results obtained in vitro, these resins, whatever their chemical nature, have a too low capacity for fixing cholate ions in vivo, because of which either the reduction in the cholesterol amount which they produce is insignificant, or they have to be used in very high doses which give rise to serious side effects at the gastro-intestinal level.

One obvious remedy to all this would seem to be to produce resins with a higher concentration of functional groups. However, it has been found that by increasing beyond a certain limit the concentration fo the basic functional groups of the resin, whether these be strong or weak, their activity reduces rather than increases.

The present invention is based on the fact that it has now been discovered that the activity of the resins depends only to a limited extent on the chemical nature and number of the basic functional groups present in it, whereas the determining factor the "accessibility" of the functional groups to the bile acid molecules which are notably compounds of steroid structure and therefore extremely voluminous and of low mobility. The immediate answer to the problem as posed would therefore seem to be to use linear soluble resins, the functional groups of which should have maximum accessibility.

However, it has been found that anionic resins of this type completely unexpectedly possess very poor activity in that the linear chains, which are not bonded together, agglomerate in an aqueous environment due mainly to coordination bonds, to form a completely random pseudo lattice into which it is practically impossible for the large bile acid molecules to penetrate, and this therefore removes most of the active groups from the ion exchange reaction.

In the same manner, highly cross-linked resins have a very low and insufficient activity due to the formation of a too narrow lattice inaccessible to the bile acid molecules.

According to the present invention, it has now been found that cholesterol-decreasing anionic exchange resins of very high activity are obtained by decreasing anionic exchange resins of very high activity are obtained by producing resins having a degree of regular cross-linking which is contained within very definite critical limits, which are different for each type of resin.

The purpose of the regular cross-linking according to the present invention is to form "meshes" in the polymer which have an aperture essentially 37 corresponding" to the volume of the bile acids, which can thus come into contact in the alimentary canal with the highest possible number of active functional groups.

As functional groups of different chemical nature have different volumes and therefore create a different degree of attrition and steric hindrance inside the "meshes", it is apparent that the critically effective degree of cross-linking will be different according to the chemical nature of the resin. However, it in no way depends on whether the resin has a gel, microporous or macroporous structure.

In other words, given a linear polymer of a determinated chemical nature and with a certain number of basic active groups, i.e. a polymer with a certain exchange power, it is provided with a determinated cholesterol-decreasing activity by producing in it a precise degree of uniform cross-linking.

To obtain this degree of cross-linking and consequently the required aperture of the meshes formed in the polymer, the cross-linking monomer in the mixture of monomers to be polymerised must be used in an exactly defined percentage.

To obtain uniformity of cross-linking, and consequently a uniform size of meshes formed in the polymer, a very low polymerisation velocity must be used by suitably choosing the catalyst, the reaction temperature, the monomer concentration in the reaction solvent, and the catalyst concentration.

It has been found that the most suitable catalysts for providing the necessary gentle polymerisation conditions are organic peroxides and in particular lauroyl and benzoyl peroxide. It is preferable to use benzoyl peroxide because it has a higher half life, and a better purity and initiation effectiveness.

The critical conditions under which the said catalysts must be used for producing the resins according to the invention are:

| Lauroyl peroxide | | |
|---|---|---|
| Acrylic: | temperature 55–65° C.; | concentration 1–2% |
| Styrene: | temperature 60–70° C.; | concentration 1–3% |
| Epoxy: | temperature 55–65° C.; | concentration 0.5–1.5% |
| Benzoyl peroxide | | |
| Acrylic: | temperature 60–70° C.; | concentration 0.2–1.5% |
| Styrene: | temperature 65–75° C.; | concentration 0.3–1.5% |
| Epoxy: | temperature 60–70° C.; | concentration 0.2–1.0% |

It has also been found that certain not easily controllable side reactions during the stages of the various processes can give rise to further cross-linking of the polymer lattice.

This can invalidate the whole of the careful construction of the resin if it is not suitably checked.

In particular, in acrylic resins this undesirable reaction can take place during the ammonification stage where polyamines are used.

In styrene resins the critical stage occurs during chloromethylation. In the case of epoxy resins, the delicate stage is the amination where polyamines are used.

It has been found that the parasite reaction can be prevented as follows:
Acrylic: in the ammonification stage, a great excess of polyamines must be used, up to 6 to 7 times the stoichiometric
Styrene: in the chloromethylation stage a gentle catalyst is used such as $ZnCl_2$ under very gentle reaction conditions, i.e. a dilute system at low temperature (35°–40° C.).
Epoxy: in the amination stage an excess of polyamine is used at low temperature (35°–40° C.).

With regard to the choice of cross-linking agent, in theory all molecules having two vinly functions which have a large distance between them can be used as cross-linking agents.

In reality the following are used in practice: divinylbenzene, divinyltoluene, divinylxylene, divinilethylbenzene and the like. Divinylbenzene is preferred because of its reactivity and its commercial availability.

It has now been unexpectedly found that the factors which determine the cholesterol-decreasing activity of an anion exchange resin and essentially the size of the cross-linkage "meshes" present in it, are a function of the apparent density in water and the absorption capacity for water of the resin, because of which the maximum activity for any resin corresponds to a substantially constant apparent density and a substantially constant water absorption capacity.

The present invention therefore provides cross-linked anionic exchange resins with cholesterol-decreasing action, having an apparent density of 0.18–0.20 g of dry material/ml, with a water absorption capacity of 69–73% by weight. This unique and constant value corresponds for each resin to determined combinations of exchange power and degree of cross-linkage (chosen within a critical and exactly defined range), and which can thus be fixed unambiguously for each resin.

For the purposes of the present invention the apparent density in water has been determined, and is to be understood hereinafter as determined, by the following method:

20 grams of dry resin (dried at 40° C. in a vacuum oven until its weight is constant) are left in 150–200 ml of water for 24 hours, stirring occasionally. The resin is then transferred into a glass column which is exactly graduated and is provided with a porous baffle.

The resin bed is then expanded in counter-current, and then after it deposits the water is discharged at a rate of 10 volumes per volume of resin until a head of 1 to 2 cm is left above the resin.

After standing for 20 minutes, the volume of the resin layer is determined. This measurement is repeated two or three times on the same sample so that the error becomes contained within 1%. The density is given by the ratio of the dry weight of the resin to its volume in water.

For the purposes of the present invention, the water absorption capacity of the resin is always to be understood as determined by the following method:

3 g of resin, dried to constant weight at a temperature of 40° C. in a reduced pressure environment, are exposed on a glass disc to an atmosphere saturated with moisture at 25° C. there is no further weight increase. The water absorbed is expressed as a percentage of the total weight.

The cholesterol-decreasing activity of the resin was determined in vitro by the following method:

20 ml of a sodium cholate solution of 2 mg/ml concentration in a 0.02 molar solution of a phosphate buffer (pH 6) are placed in a conical flask. 1 ml of $H_2O$ and 30 mg of resin are added to the flask.

After stirring for five minutes at 25° C., the contents are filtered, and the non-fixed cholic acid is determined by a spectrophotometric method after reacting with sulphuric acid (Kier et al. J. Chim. Invest 40, 755, 1952).

The activity is given by the sodium cholate fixed during the time considered. Some tens of styrene, acrylic and epoxy resins were prepared having different exchange powers and different degrees of cross-linkage. Using the above methods, the apparent density, the water absorption and activity were determined for each of the resins. Maximum activity was constantly obtained with resins having an apparent density of 0.18 to 0.20 g of dry material/ml and a water absorption capacity of 69 to 73% by weight. By this method, the critical range of exchange power and cross-linkage were determined between which it is possible to obtain a very high cholesterol-decreasing activity for any type of resin.

Using the same method, it was established that in reality all resins known up to the present time, and which have an absolutely insufficient activity to be able to be considered as an effective cholesterol-decreasing means, have an apparent density in water which is outside the limits of 0.18 to 0.20 g of dry material/ml, and in particular a density and water absorption which indicate poor non-uniform cross-linkage (Cholestyramine type) or an excessive and non-uniform cross-linkage (Lewatit MP 500 and Cholestypol types of resin).

The strong exchange power and the total exchange power were also determined for each resin.

The strong exchange power as determined by the following method: 10 g of dry resin are converted to the $OH^-$ by percolating a 5% aqueous NaOH solution until $Cl^-$ ions were no longer found in the eluate. The resin is then abundantly washed with water until neutral. The $OH^-$ form is reconverted to $Cl^-$ by percolating 400 ml of a 10% aqueous NaCl solution, then washing with 1000 ml of $H_2O$. The base contained in the eluate is titrated with 0.1 N HCl, 1 ml of HCl used corresponding to 0.01 milliequivalents (meq) per gram. The total exchange power was determined by the following method: 10 g of resin, made into the OH and free amine form as described in the preceding method, are treated with 100 ml of 1 N HCl and are then washed with water until neutral.

The HCl of the eluate is titrated with 0.1 N NaOH using methyl red as indicator.

The total exchange power of the resin is given by the number of milliequivalents of acid not found in the eluate divided by 10.

The critical values which were determined for the most common types of anion exchange resins according to the invention as being necessary to give high cholesterol-decreasing power are as follows: Styrol resins with amino and ammonium groups

| Strong exchange power meq/g | 2.8–4.0 |
| Total exchange power meq/g | 2.8–4.0 |
| Cross-linkage % | 1.5–2.5 |
| Acrylic resins with amino and ammonium groups | |
| Strong exchange power meq/g | 2.0–3.0 |
| Total exchange power meq/g | 5.5–8.0 |
| Cross-linkage % | 10–12 |
| Epoxy resins with amino and ammonium groups | |
| Strong exchange power meq/g | 2–5 |
| Total exchange power meq/g | 10–12.5 |
| Cross-linkage % | 3–4 |

In the case of epoxy resins, the term "cross-linkage" obviously indicates only the cross-linkage due to the cross-linking agent, and that due to the amine is ignored.

Some practical examples of cholesterol-decreasing resins according to the invention are given hereinafter by way of example only.

EXAMPLE 1

Preparation of a microporous acrylic resin (AP2)

A mixture consisting of 33 parts of acrylic nitrile, 16 parts of methyl acrylate, 10 parts of technical divinylbenzene (strength 60%), 1 part of benzoyl peroxide and 40 parts of toluene is suspended by agitation in an aqueous solution containing 20% of gelatine by weight.

1 part of bentonite is added to the suspension. The suspension is heated for 40 hours at 65° C.

The polymer thus obtained, which is in the form of opaque pearls, is carefully washed from the residues of the dispersing solution. The porosity agent is then removed by steam distillation, and the polymer is then dried.

1 part of polymer is treated with 5 parts of ethylenediamine for 10 hours at 130° C. After cooling, the excess amine is removed by repeated washing with water. The product obtained is immersed in 50 parts of $H_2O$ and 50 parts of $Na_2Co_3$, cooled to 0° and treated with 400 parts fo $CH_2Br$ for 5 hours under agitation.

It is finally filtered, washed with $H_2O$ and then put into the chloride form in a percolation column by slowly percolating 1000 parts of a 5% aquaeous solution of NaCl.

A resin is obtained having the following characteristics:

| Cross-linkage | 10% |
| Strong exchange power | 2.1 meq/g |
| Total exchange power | 6.2 meq/g |
| $H_2O$ absorption capacity | 71% |
| Apparent density | 0.186 g/ml |
| Activity | 18 ± 0.4 mg/cholate fixed |
| Amine | tertiary + quaternary type |

EXAMPLE 2

Preparation of a standard acrylic resin (AP1)

A mixture consisting of 55 parts of acrylic nitrile, 26.5 parts of methyl acrylate, 18.3 parts of technical divinylbenzene (60%) and 0.2 parts of benzoyl peroxide is suspended by agitation in an aqueous solution containing 20% gelatine by weight. 2 parts of bentonite are added to the suspension. The suspension is heated for 40 hours at 70° C. The polymer obtained in this manner is washed, ammonified, made quanternary and put into the chloride form as in the previous example.

A resin is obtained having the following characteristics:

| Cross-linkage | 11% |
| Strong exchange power | 2.1 meq/g |
| Total exchange power | 6.1 meq/g |
| $H_2O$ absorption capacity | 70.4% |
| Apparent density | 0.192 g/ml |
| Activity | 18 ± 0.4 mg/cholate fixed |
| Amine | tertiary + quaternary type |

EXAMPLE 3

Preparation of a standard styrene resin ($S_1$)

A mixture consisting 96.5 parts of styrene, 2.5 parts of technical divinylbenzene (60%) and 1.0 part of benzoyl peroxide is suspended by agitation in an aqueous solution containing 15% gelatine by weight. 0.7 parts of bentonite are added to the suspension.

The suspension is heated for 40 hours at 70° C.

The polymer thus obtained is carefully washed from the residues of the dispersing solution and dried.

The entire product is then chloromethylated with monochloroether (200 parts) and zinc chloride (65 parts) after expanding it in dichloroethane (300 parts), heating the mixture for 7 hours at 35° C.

Finally, the intermediate obtained is animated with trimethyl amine (180 parts of 40% aqueous solution) at 45° C. for 6 hours.

A resin is obtained having the following characteristics:

| Cross-linkage | 1.5% |
| Strong exchange power | 3.3 meq/g |
| Total exchange power | 3.3 meq/g |
| $H_2O$ absorption capacity | 71.7% |
| Apparent density | 0.180 g/ml |
| Activity | 15 ± 0.4 mg/cholate fixed |
| Amine | quaternary type |

EXAMPLE 4

Preparation of a standard styrene resin ($S_2$)

A mixture consisting of 95 parts of styrene, 3.5 parts of technical divinylbenzene (strength 60%) and 0.7 parts of benzoyl peroxide is suspended by agitation in an aqueous solution containing 15% gelatine by weight.

0.7 parts of bentonite are added to the suspension.

The suspension is heated for 40 hours at 70° C. The polymer obtained is washed, dried, chloromethylated and aminated as in Example 3.

A resin is obtained having the following characteristics:

| | |
|---|---|
| Cross-linkage | 2.1% |
| Strong exchange power | 3.3 meq/g |
| Total exchange power | 3.3 meq/g |
| $H_2O$ absorption capacity | 71.5% |
| Apparent density | 0.195 g/ml |
| Activity | 15 ± 0.4 mg/cholate fixed |
| Amine | quaternary type |

EXAMPLE 5

Preparation of a standard epoxy resin ($E_4$)

A mixture consisting of 93.3 parts of epichlorydrine, 6.5 parts of technical divinylbenzene (strength 60%) and 0.2 parts of benzoyl peroxide is suspended by agitation in an aqueous solution containing 20% gelatine by weight.

The suspension is heated at 65° C. for 40 hours.

The polymer thus obtained is carefully washed from the residues of the dispersing system and dried.

The whole of the polymer is then treated with 100 parts of ethylene-diamine and 40 parts of NaOH flakes at 65° C. for 10 hours under agitation. The product obtained is washed with water to remove the excess of amine, and is then immersed in 50 parts of $H_2O$ and 50 parts of $Na_2CO_3$, and treated with 500 parts of $CH_3Br$ for 5 hours at 0° C. under agitation. It is finally filtered, washed with water and is then put into the chloride form in a percolation column by slowly percolating 1000 parts of a 5% aqueous solution of NaCl.

A resin is obtained having the following characteristics:

| | |
|---|---|
| Cross-linkage | 4% |
| Strong exchange power | 2.1 meq/g |
| Total exchange power | 10.5 meq/g |
| $H_2O$ absorption capacity | 69.5% |
| Apparent density | 0.180 g/ml |
| Activity | 12 ± 0.8 mg/cholate fixed |
| Amine | tertiary + quaternary type |

EXAMPLE 6

Preparation of a standard epoxy resin ($E_3$)

A mixture consisting of the 94.8 parts of epichlorydrine, 5 parts of technical divinylbenzene (strength 60%) and 0.2 parts of benzoyl peroxide is suspended by agitation in an aqueous solution containing 20% gelatine by weight.

The suspension is heated at 65° C. for 40 hours.

The polymer thus obtained is washed, animated and made quaternary as in the previous example.

A resin is obtained having the following characteristics:

| | |
|---|---|
| Cross-linkage | 3% |
| Strong exchange power | 2.3 meq/g |
| Total exchange power | 10.9 meq/g |
| $H_2O$ absorption capacity | 70.5% |
| Apparent density | 0.180 g/ml |
| Activity | 12 ± 0.8 mg/cholate fixed |
| Amine | tertiary + quaternary type |

For greater clarity, the characteristic data of the new resins are summarised in the following table, compared with the same data for the most known resins available for some years

| Resin name<br>Resin type | Cholestyramine<br>quat. styrene | Lewatit MP 500<br>quat. styrene | Lewatit MP 62<br>tert. styrene | IRA 458 tert. +<br>quat. acrylic | Cholestypol sec. +<br>tert. + quat. epoxy |
|---|---|---|---|---|---|
| Cross-linkage | 2 | >5 | >5 | >5 | >5 |
| Strong exchange power meq/g | 2.9 | 3.6 | — | 3.6 | 4.5 |
| Total exchange power meq/g | 2.9 | 3.6 | 4.2 | 4.3 | 12.3 |
| $H_2O$ absorption capacity % | >65 | 36 | 28 | 61 | >65 |
| Apparent density g/ml | 0.047 | 0.275 | 0.280 | 0.34 | 0.070 |
| Activity mg/cholate fixed | 8 ± 0.8 | 6 ± 0.8 | 5 ± 0.8 | 8 ± 0.8 | 6 ± 0.8 |

| Resin name<br>Resin type | $AP_2$<br>tert. + quat.<br>acrylic | $AP_1$<br>tert. + quat.<br>acrylic | $S_1$<br>quat.<br>styrene | $S_2$<br>quat.<br>styrene | $E_4$<br>tert. + quat.<br>epoxy | $E_3$<br>tert. + quat.<br>epoxy |
|---|---|---|---|---|---|---|
| Cross-linkage | 10 | 11 | 1.5 | 2.1 | 4 | 3 |
| Strong exchange power meq/g | 2.1 | 2.1 | 3.3 | 3.2 | 2.1 | 2.3 |
| Total exchange power meq/g | 6.2 | 6.1 | 3.3 | 3.2 | 10.5 | 10.9 |
| $H_2O$ absorption capacity % | 71 | 70.4 | 71.7 | 71.5 | 69.5 | 70.5 |
| Apparent density g/ml | 0.186 | 0.192 | 0.180 | 0.195 | 0.180 | 0.180 |
| Activity mg/cholate fixed | 18 ± 0.4 | 18 ± 0.4 | 15 ± 0.4 | 15 ± 0.4 | 12 ± 0.8 | 12 ± 0.8 |

The cholesterol-decreasing activity of the new resins according to the invention was also examined "in vivo".

To examine the "in vivo" cholesterol-decreasing effect of the various resins, the following tests were used:

(1) Their action on hypercholesterolemia produced by a diet enriched in cholesterol in the rat and rabbit
(2) Their action on the fecal excretion of bile acids in the dog.

(1) To induce hypercholesterolemia in rats, the animals were kept under a diet in accordance with Nath and colleagues (J. Nutrit 67, 289, 1959)

| | |
|---|---|
| devitaminised casein | 20% |
| dl-methionine | 0.4% |
| Hegsted saline mixture | 4% |
| saccharose | 49.1% |
| cholesterol | 1% |
| cholic acid | 0.5% and vitamins. |

To induce hypercholesterolemia in rabbits, 1 g/day/animal of cholesterol was administered by means of a gastric probe. Each animal species comprised 84 male animals, namely rats of the Sprague-Dawley stock having an average weight of 200 g and New Zealand rabbits of 3 kg, divided into 12 groups of 7 animals each.

All the animals were put into a state of hypercholesterolemia by means of a diet. One group underwent no treatment, whereas the other 11 groups were treated with 05 g/kg of one of the resins for 30 days. The resins were dissolved or suspended in 10% gum arabic mucilage. Only gum arabic mucilage was administered to the control group. On the thirtieth day of treatment all the animals were sacrificed and the total plasmatic cholesterol was measured in the blood collected from the carotid arteries (Pearson and colleagues J. Chim. Endocrin. Metabolism 12, 1245, 1952).

(2) To evaluate fecal excretion of bile acids, 48 male beagles dogs weighing about 8 kg were used and were divided into 12 groups of 4 animals each. All the animals were kept under standard diet and living, and with the exception of one control group of dogs, all groups were given, in addition to their diet, 2 g/kg/day of one of the resins for 25 days. On the 26th day from the beginning of the experiment, the bile acids were determined in the feces of the dogs, which were fasted for 12 hours in a metabolic cage (Grundy and colleagues, J. Lipid Res. 6, 397, 1965; Makita and colleagues, Ann. Biochem. 5, 523, 1963; Forman and colleagues, Clin. Chem. 14, 348, 1969).

Tables 1 and 2 summarize the results obtained in the rats and rabbits put into a state of hypercholesterolemia by diet, and treated with the various resins examined.

The cholesterol-decreasing effect of the resins administered orally in "in vivo" equal-weight doses substantially agreed with the "in vitro" results.

In this respect, it was found that again in this case resins having an apparent density in water of 0.18 to 0.20 g of dry material/ml and a water absorption capacity of 69 to 73% by weight of the weight of polymer have a cholesterol-decreasing effect both in rats and in rabbits, which is surprisingly superior to that ever obtained with other resins. The differences with respect to known resins are all highly significant ($P > 0.01$).

Table 3 shows the bile acid excretion values for dogs treated with 2 g/kg/day of the various resins.

It can clearly be seen that administering the resins prepared according to the present invention produces a considerable increase in bile acid fecal excretion relative to that obtained with the best resins commercially available at the present time.

Highly significant differences ($P > 0.01$) exists between the bile acid values excreted with the feces after administering $AP_2$, $AP_1$, $S_1$, $S_2$, $E_4$ and $E_3$ and the values obtained with the other resins.

TABLE 1

Total seric cholesterol values in rats subjected to a Nath diet for 30 days and treated with various resins

|  | Controls | Cholestyramine | Lewatit MP 500 | Lewatit MP 62 | IRA 458 | Cholestypol | $AP_2$ | $AP_1$ | $S_1$ | $S_2$ | $E_4$ | $E_3$ |
|---|---|---|---|---|---|---|---|---|---|---|---|---|
| No. rats | 7 | 7 | 7 | 7 | 7 | 7 | 7 | 7 | 7 | 7 | 7 | 7 |
| mg % | 281 ± 16.8 | 120 ± 6.2 | 176 ± 12.4 | 197 ± 13.9 | 131 ± 7.3 | 123 ± 5.8 | 94 ± 4.3 | 91 ± 4.3 | 84 ± 3.7 | 80 ± 3.9 | 112 ± 5.1 | 114 ± 5.3 |

TABLE 2

Total seric cholesterol values in rabbits subjected to a cholesterol enriched diet for 30 days and treated with various resins

|  | Controls | Cholestyramine | Lewatit MP 500 | Lewatit MP 62 | IRA 458 | Cholestypol | $AP_2$ | $AP_1$ | $S_1$ | $S_2$ | $E_4$ | $E_3$ |
|---|---|---|---|---|---|---|---|---|---|---|---|---|
| No. rabbits | 7 | 7 | 7 | 7 | 7 | 7 | 7 | 7 | 7 | 7 | 7 | 7 |
| mg % | 689 ± 21.4 | 204 ± 5.1 | 488 ± 15.6 | 541 ± 17.8 | 356 ± 16.5 | 210 ± 4.2 | 151 ± 3.7 | 139 ± 3.5 | 128 ± 3.6 | 131 ± 4.2 | 196 ± 6.1 | 198 ± 7.2 |

TABLE 3

Fecal excretion of bile acids in dogs subjected to 25 days treatment with various resins

|  | Controls | Cholestyramine | Lewatit MP 500 | Lewatit MP 62 | IRA 458 | Cholestypol | $AP_2$ | $AP_1$ | $S_1$ | $S_2$ | $E_4$ | $E_3$ |
|---|---|---|---|---|---|---|---|---|---|---|---|---|
| No. dogs | 4 | 4 | 4 | 4 | 4 | 4 | 4 | 4 | 4 | 4 | 4 | 4 |
| mcg/g of feces | 678 ± 39 | 2310 ± 101 | 1210 ± 81 | 984 ± 47 | 1415 ± 53 | 2152 ± 94 | 2705 ± 114 | 2744 ± 118 | 2751 ± 117 | 2695 ± 109 | 2587 ± 102 | 2548 ± 106 |

The data heretofore given show clearly that the new resins, independently of the chemical nature of the matrix and its physical form (microporous, microporous or gel) are able to electively bond the bile acids, and can give rise to a cholesterol-decreasing effect when administered orally, which is of an extent superior to that obtained with any resin used up to the present time.

What we claim is:

1. An anionic ion exchange resin prepared from monomers of the group consisting of non-toxic styrene, acrylic or epoxy compounds, cross-linked through divinylbenzene and containing methylamino and methylammonium groups, which resin has strong cholesterol-decreasing properties, an apparent density in water of 0.18 to 0.20 g of dry material/ml and a water absorption capacity of 69 to 73% by weight of the polymer weight wherein the amount of cross-linking agent when the monomer is styrene is not substantially less than 1.5% by weight and not substantially more than 2.5% by weight, when the monomer is an acrylic is not substantially less than 10% by weight and not substantially more than 12% by weight and when the monomer is an epoxy is not substantially less than 3% by weight and not substantially more than 4% by weight, said weight ratios being calculated on the combined weight of the monomer and of the cross-linking agent.

2. A styrene resin which is a polymer of styrene cross-linked with divinylbenzene, containing methylamino and methylammonium groups, as claimed in claim 1, with the following characteristics:

| | |
|---|---|
| cross-linkage | 1.5–2.5% |
| strong exchange power | 2.8–4.0 meq/g |
| total exchange power | 2.8–4.0 meq/g |

3. An acrylic resin which is a polymer or copolymer of acrylic nitrile or methyl acrylate, cross-linked with divinylbenzene, containing methylamino and methylammonium groups, as claimed in claim 1, with the following characteristics:

| | |
|---|---|
| cross-linkage | 10–12% |
| strong exchange power | 2–3.0 meq/g |
| total exchange power | 5.5–8.0 meq/g |

4. A process for producing anionic ion exchange resin with strong cholesterol-decreasing properties, in which a mixture of monomers selected from the group consisting of styrene, acrylic nitrile, methyl acrylate, containing a cross-linked divinyl monomer at a polymerisation temperature of 50° C. to 80° C. when the resin is a styrene in an amount not substantially less than 1.5% by weight and not substantially more than 2.5% by weight and when the resin is an acrylic in an amount not substantially less than 10% by weight and not substantially more than 12% by weight, which mixture of monomers, corresponding to an apparent density in water of 0.18 to 0.20 of dry material/ml with a water adsorption capacity of 69 to 73% of weight of the polymer weight, wherein the polymerisation catalyst used is an organic peroxide in a concentration of 0.20 to 3% and the thus obtained polymer undergoes a methyl-amination and methylammonification step.

5. A process, as claimed in claim 4, wherein the organic peroxide is benzoyl peroxide or lauroyl peroxide.

6. A process, as claimed in claim 4, wherein the resin produced is styrene polymerised with 1.5 to 2.5 of divinyl-benzene) 100% in the presence of a concentration of 1 to 3% of lauroyl peroxide as catalyst, at a temperature of 60° to 70° C., whose animation-ammonification step is realized through chloromethylation in the presence of Zn Cl₂ at 35°–40° C. followed by treatment with trimethylamine at 45° C.

7. A process, as claimed in claim 4, wherein the resin produced is styrene polymerised with 1.5 to 2.5% of divinyl-benzene (100%) in the presence of a concentration of 0.3 to 15% of benzoyl peroxide as catalyst, at a temperature of 65° to 75° C., whose amination-ammonification step is realized through chloromethylation in the presence of Zn Cl₂ at 35°–40° C. followed by treatment with trimethylamine at 45° C.

8. A process, as claimed in claim 4, wherein the resin produced is an acrylic resin produced from an acrylic nitrile or methylacrylate monomer polymerised with 10 to 12% of divinyl-benzene (100%) in the presence of a concentraton of 1 to 2% of lauroyl peroxide as catalyst, at a temperature of 55° to 65° C., whose amination-ammonification step is performed by treatment with 6-7 times the stoichiometric of a polyamine, followed by treatment with CH₃ Br and than with a 5% aqueous solution of NaCl.

9. A process, as claimed in claim 4, wherein the resin produced is an acrylic resin produced from an acrylic monomer polymerised with 10 to 12% of divinyl-benzene (100%) in the presence of a concentration of 0.2 to 1.5% of benzoyl peroxide as catalyst, at a temperature of 60° to 70° C.

10. Therapeutic composition with cholesterol-decreasing action, comprising an anionic ion exchange resin prepared from monomers of the group consisting of non-toxic styrene, acrylic or epoxy compounds cross-linked through divinylbenzene and containing methylamino and methylammonium groups having an apparent density in water of 0.18 to 0.20 g of dry material/ml and a water absorption capacity of 69 to 73% by weight of the polymer weight wherein the amount of cross-linking agent when the monomer is styrene is not substantially less than 1.5% by weight and not substantially more than 2.5% by weight, when the monomer is an acrylic is not substantially less than 10% by weight and not substantially more than 12% by weight and when the monomer is an epoxy is not substantially less than 3% by weight and not substantially more than 4% by weight, said weight ratios being calculated on the combined weight of the monomer and the cross-linking agent.

11. An anionic ion exchange epoxy resin with strong, cholesterol-decreasing properties, which is a polymer of epichloridrine cross-linked with divinylbenzene, containing methylamino and methylammonium groups and has an apparent density in water of 0.18 to 0.20 g of dry material/ml and a water absorption capacity of 69 to 73% by weight of the polymer weight said epoxy resin having the following characteristics:

| | |
|---|---|
| cross-linkage | 3–4% |
| strong exchange power | 2–5 meq/g |
| total exchange power | 10–12.5 meq/g |

12. A process for producing anionic ion exchange epoxy resin with strong cholesterol-decreasing properties, in which epichlorydrine is polymerised with 3 to 5% of divinyl-benzene (100%) in the presence of an organic peroxide as catalyst in a concentration of 0.2 to 1.5%, at a polymerisation temperature of 55° to 70° C. and the thus obtained polymer undergoes an amination and ammonification step with an excess of polyamine, at a temperature of 35°–40° C. followed by treatment with CH₃ Br and a 5% NaCl solution.

13. A process, as claimed in claim 12, in which the organic peroxide catalyst is lauroyl peroxide in a concentration of 0.5–1.5% at a polymerisation temperature of 55°–65° C.

14. A process, as claimed in claim 12, in which the organic peroxide catalyst is benzoyl peroxide in a concentration of 0.2–1.0% at a polymerisation temperature of 60°–70° C.

* * * * *